United States Patent
Langenwalter et al.

(10) Patent No.: US 9,182,510 B2
(45) Date of Patent: Nov. 10, 2015

(54) METHODS AND SYSTEMS OF INCORPORATING PSEUDO-SURFACE PICK LOCATIONS IN SEISMIC VELOCITY MODELS

(75) Inventors: Richard J. Langenwalter, Lakewood, CO (US); Lance O. Hayne, Centennial, CO (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 13/982,313

(22) PCT Filed: Aug. 20, 2012

(86) PCT No.: PCT/US2012/051568
§ 371 (c)(1),
(2), (4) Date: Jul. 29, 2013

(87) PCT Pub. No.: WO2014/031094
PCT Pub. Date: Feb. 27, 2014

(65) Prior Publication Data
US 2014/0222345 A1  Aug. 7, 2014

(51) Int. Cl.
*G01V 1/28* (2006.01)
*G01V 1/40* (2006.01)
*G01V 1/30* (2006.01)

(52) U.S. Cl.
CPC .. *G01V 1/30* (2013.01); *G01V 1/28* (2013.01); *G01V 1/303* (2013.01); *G01V 2210/614* (2013.01); *G01V 2210/6222* (2013.01); *G01V 2210/66* (2013.01)

(58) Field of Classification Search
USPC .............. 702/14, 16, 18, 9, 7; 345/442, 419
See application file for complete search history.

(56) References Cited

U.S. PATENT DOCUMENTS

| | | | |
|---|---|---|---|
| 4,635,238 | A | 1/1987 | Gallagher et al. |
| 5,570,321 | A | 10/1996 | Bernitsas |
| 5,675,147 | A | 10/1997 | Ekstrom et al. |
| 6,611,761 | B2 | 8/2003 | Sinha et al. |

(Continued)

FOREIGN PATENT DOCUMENTS

| EP | 1176393 | A2 | 1/2002 |
|---|---|---|---|
| WO | WO 2009151441 | A1 * | 12/2009 |

(Continued)

OTHER PUBLICATIONS

International Search Report and Written Opinion issued Mar. 14, 2013 in International Application No. PCT/ US2012/051568, filed Aug. 20, 2012.

(Continued)

*Primary Examiner* — Michael Nghiem
*Assistant Examiner* — Eman Alkafawi

(57) ABSTRACT

Incorporating pseudo-surface pick locations in seismic velocity models. At least some of the illustrative embodiments are methods including: refining a seismic velocity model by correlating a predicted log to a measured log; creating a pseudo-surface pick location in a modeled subsurface horizon based on the correlating; modifying at least a portion of a seismic velocity model based on the pseudo-surface pick location; recalculating the modeled subsurface horizon based on the seismic velocity model, thereby creating a modified surface; and plotting the modified surface on a display device of a computer system.

27 Claims, 7 Drawing Sheets

(56) References Cited

U.S. PATENT DOCUMENTS

| | | | |
|---|---|---|---|
| 6,982,928 | B2 | 1/2006 | Al-Ali |
| 7,191,850 | B2 | 3/2007 | Williams |
| 8,219,319 | B2 | 7/2012 | Skelt |
| 8,593,462 | B2 * | 11/2013 | Ross et al. .................... 345/440 |
| 2004/0006450 | A1 * | 1/2004 | Hale ........................... 702/189 |
| 2005/0140373 | A1 | 6/2005 | Li et al. |
| 2005/0207278 | A1 * | 9/2005 | Reshef et al. ................... 367/38 |
| 2006/0247990 | A1 * | 11/2006 | Narayanan et al. ............. 705/35 |
| 2007/0118293 | A1 | 5/2007 | Adams |
| 2008/0172180 | A1 * | 7/2008 | Garotta ................. G01V 1/362 702/14 |
| 2009/0259406 | A1 * | 10/2009 | Khadhraoui et al. ........... 702/14 |
| 2010/0088035 | A1 | 4/2010 | Etgen et al. |
| 2010/0259415 | A1 | 10/2010 | Strachan et al. |
| 2011/0042080 | A1 | 2/2011 | Birchwood et al. |
| 2012/0179379 | A1 * | 7/2012 | Alshawaf et al. ................. 702/9 |

FOREIGN PATENT DOCUMENTS

| | | |
|---|---|---|
| WO | 2011/146079 A1 | 11/2011 |
| WO | 2013/019174 A1 | 2/2013 |

OTHER PUBLICATIONS

Paradigm Ltd. Paradigm (R) Explorer (R)—Time-to-Depth Conversion—Interpretation and Modeling. Web. http://www.pdgm.com/getattachment/Resources/Brochures/Explorer/Explorer.pdf.aspx. 2011.

International Search Report and Written Opinion issued Mar. 5, 2012 in International Patent Application No. PCT/ US2011/045841, filed Jul. 29, 2011.

* cited by examiner

US 9,182,510 B2

METHODS AND SYSTEMS OF INCORPORATING PSEUDO-SURFACE PICK LOCATIONS IN SEISMIC VELOCITY MODELS

BACKGROUND

Advances in horizontal drilling have increased the ability to economically recover hydrocarbons from hydrocarbon bearing formations. However, placement of the horizontal borehole (also known as a lateral) requires particular accuracy. For example, a shale formation may be several thousand feet below the surface, and the shale formation itself may be on the order of 1000 feet thick. Within the illustrative 1000 feet of thickness only a few relatively thin zones, each zone on the order of tens of feet thick, may be suitable locations for placement of the lateral and extraction of hydrocarbons (i.e., target zones). Outside the target zones, some hydrocarbon extraction may be possible, but such extraction is in most cases not economically viable.

Moreover, physical phenomena such as faulting and differential compaction may make the true vertical depth of a target zones different as a function of horizontal location within the hydrocarbon bearing formation. Even if one is able to identify at a particular location a target zone for lateral placement (e.g., at a survey borehole), the precise depth of the target zone may change as a function of distance from the particular location.

Thus, any advance which results in better steering of horizontal boreholes would provide a competitive advantage.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
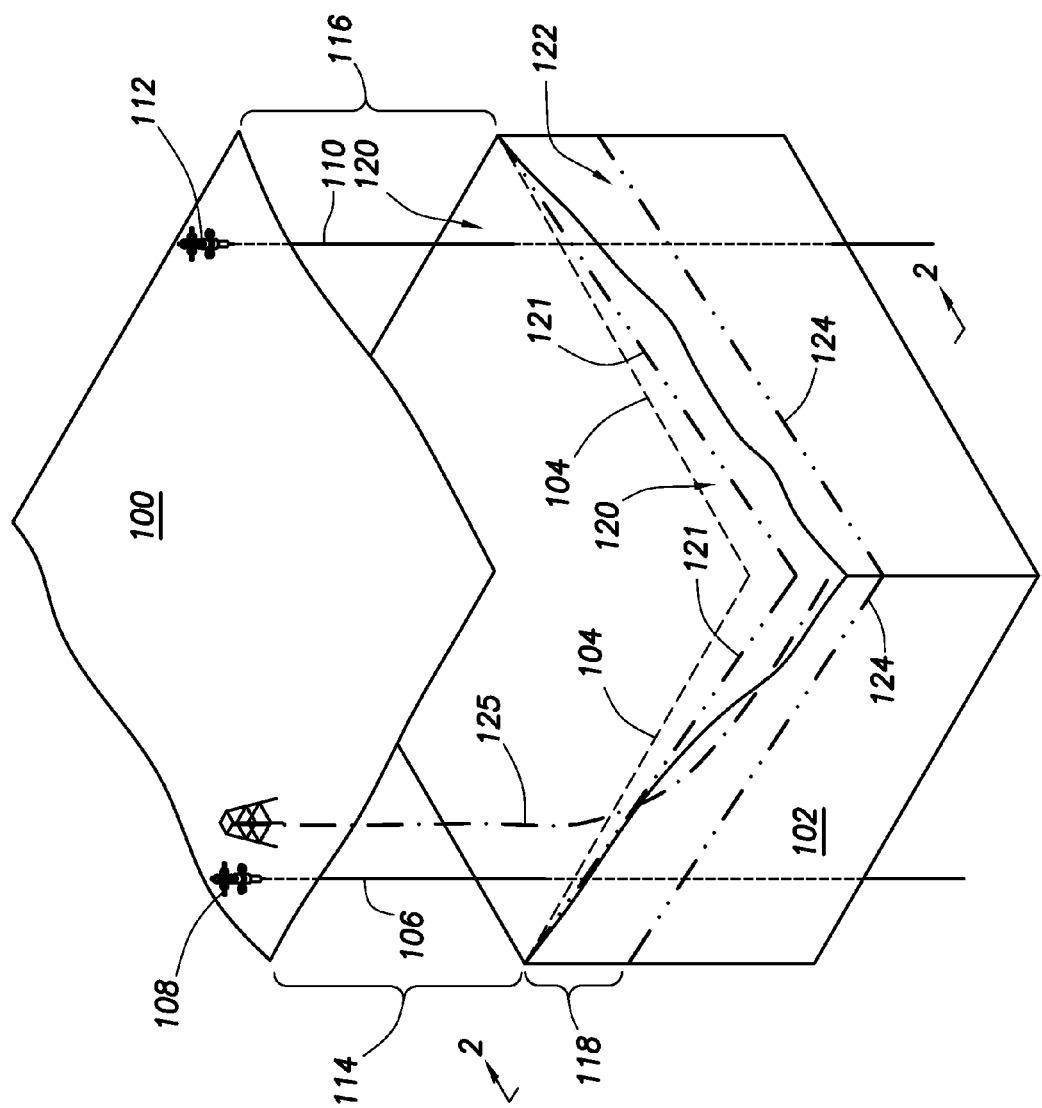
FIG. 1 shows a perspective cutaway view of a portion of hydrocarbon bearing formation, and in accordance with at least some embodiments.

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the terms "couple" or "couples" are intended to mean either an indirect, direct, optical or wireless electrical connection. Thus, if a first device couples to a second device, that connection may be through a direct connection or through an indirect connection via other devices and connections.

"Measured log" shall mean a series of values where each value is indicative of a measured parameter of a rock formation at a position along a borehole. Measured log shall include not only an entire measured log, but also portions of a measured log less than the entire measured log.

"Predicted log" shall mean a series of values where each value is indicative of a predicted parameter of a rock formation at a position along a borehole. Predicted log shall include a log created by one or more actual logs or may include a measured log determined at a different position within the same borehole. Predicted log shall include not only an entire predicted log, but also portions of a predicted log less than the entire predicted log.

"Borehole" shall mean a hole drilled into the Earth's crust used directly or indirectly for the exploration or extraction of natural resources, such as oil, natural gas, or water.

"Horizontal borehole" shall mean a borehole where at least a portion of the borehole has a deviation from the vertical orientation that exceeds at least 20 degrees. The fact that a borehole may initially be drilled with a vertical orientation, and the fact that the horizontal borehole may not be exactly horizontal in relation to a face of the earth or a horizontal plane, shall not obviate the status as a horizontal borehole.

"Drag-and-drop" shall mean that a feature on a display device is selected responsive to commands received from a pointing device, and while selected, the position of the feature is changed responsive to commands received.

"Surface pick location" shall mean a point at which a borehole actually penetrates a physical location corresponding to a modeled subsurface horizon.

"Pseudo-surface pick location" shall mean a point at which an indication is placed within a modeled subsurface horizon based on a borehole, but where the borehole does not penetrate the physical depth/location corresponding to the point within the modeled subsurface horizon.

"Non-linear" with respect to a modeled subsurface horizon, shall mean that the subsurface horizon has curvature as opposed to representing a straight line. Non-linear shall not refer to discontinuities (e.g., step functions) in the modeled subsurface horizon.

"Real-time" in relation to performing a task related to a seismic velocity model or a modeled horizon shall mean completing the task with in one minute or less from a trigger event.

"Animating" or "animation" in relation to operations associated with a display device shall mean that changes in a plotted object are presented at 15 frames per second or greater.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to communicate that the scope of the disclosure, including the claims, is limited to that embodiment.

Underground hydrocarbon bearing formations may reside several thousand feet below the face of the earth, and may be several thousand feet thick. While an entire formation may be saturated to some extent with hydrocarbons, hydrocarbons may be economically produced from particular locations (e.g., near the top of the formation of porous rock, or within particular zones of shale formations). The relatively small zones from which hydrocarbons can be economically produced are referred to herein as target zones.

Various embodiments are directed to methods and systems of refining not only modeled surfaces, but also by refining seismic velocity models such that seismic depth volumes better indicate the locations of various subsurface horizons of interest. In order to more fully describe the methods and system, the specification first turns to a high level description to orient the reader.

FIG. 1 shows a perspective cutaway view of a portion of the earth's crust. In particular, FIG. 1 shows the face 100 of the earth (referred to as the face rather than the "surface" as "surface" has a particular meaning discussed more below). Below the face 100 is a portion of a hydrocarbon bearing formation 102 (shown in solid lines). Though the materials that make up hydrocarbon bearing formation 102 may initially be deposited in horizontal layers, differential compaction and faulting may result in dip. In particular, dashed line 104 may illustrate two edges of a horizontal plane, and thus the illustrative hydrocarbon bearing formation 102 dips downwardly in the direction of the viewer in FIG. 1.

FIG. 1 also shows several boreholes drilled into the hydrocarbon bearing formation. For example, borehole 106 is shown to be a vertically oriented borehole that extends through the hydrocarbon bearing formation 102. Borehole 106 is associated with wellhead 108 to illustrate that borehole 106 has been previously drilled, and in some situations borehole 106 may have a casing therein. Likewise, FIG. 1 illustrates borehole 110 as a vertically oriented borehole that extends through the hydrocarbon bearing formation 102. Borehole 110 is associated with wellhead 112 to illustrate that borehole 110 has been previously drilled, and in some situations may have a casing therein. In the industry, boreholes 106 and 110 may be referred to as "offset wells" or "type wells" when discussed in relation to horizontal boreholes which are planned or currently being drilled, and thus will be referred herein as offset wells 106 and 110. While offset wells 106 and 110 are shown as vertically oriented and extending completely through the hydrocarbon bearing formation 102 so as to be distinguishable from the proposed horizontal borehole (discussed more below), offset wells need not necessarily be vertically oriented, or extend through the hydrocarbon bearing formation. Stated otherwise, offset wells may be any type of borehole, including horizontal boreholes.

Information useful for planning a trajectory of a horizontal borehole may be determined from the offset wells 106 and 110. For example, by way of offset well 106, the vertical depth 114 of the top of the hydrocarbon bearing formation 102 at the location of the offset well 106 may be accurately measured. Likewise, by way of offset well 110, the vertical depth 116 at the top of the hydrocarbon bearing formation 102 at the location of offset well 110 may be accurately measured. Moreover, a plurality of well logs may be taken within offset wells 106 and 110. For example, the offset wells may be logged while drilling, may be logged during the overall drilling process but with the drill string removed (e.g., logged by way of wireline logging devices), and/or may be logged after drilling has completed and a casing has been cemented therein. The well logs may provide a host of information about the hydrocarbon bearing formation 102. For example, the well logs taken in the offset wells may provide identifying information (i.e., marker information) for various depths within the hydrocarbon bearing formation 102. That is, the marker information may be based on any measurable property of the hydrocarbon bearing formation, such as natural gamma radiation or electrical resistivity.

In addition to measurements gathered from offset wells 106 and 110, a seismic survey may be conducted to provide seismic mapping of the hydrocarbon bearing formation 102. In order to conduct a seismic survey, a seismic source device, such as the explosion of dynamite or a thumper truck, generates seismic waves which travel into the subsurface layers, including into hydrocarbon bearing formation 102. The seismic waves partially reflect off the subsurface horizons of each subsurface layer the seismic waves encounter. The seismic waves reflected back towards the earth's face are received by an array of seismic receivers, such as geophones, and arrival times and amplitudes are recorded. The set of arrival times and amplitudes may be referred to as a seismic time/amplitude volume. A seismic velocity model, comprised of known or estimated seismic velocity properties of each subsurface layer, is applied to the seismic time/amplitude volume which creates a seismic amplitude/depth volume (hereafter just "seismic depth volume"). In other words, the seismic depth volume is a seismic volume represented by an array of amplitude/depth information. It is to be understood that the seismic time/amplitude volume, the seismic velocity model, and the seismic depth volume are separate data structures. As better information regarding the seismic velocity is determined, the seismic velocity model may be updated, and a new and/or updated seismic depth volume may be created. The seismic depth volume, as describe in further detail below, provides the geologist information to aid in the placement of a horizontal boreholes.

For purposes of further discussion, it is assumed that a target zone 118 of interest is a location just under the top of the hydrocarbon bearing formation 102; however, target zones need not be near the top of the hydrocarbon bearing formation. For example, in shale formations the target zone may reside at any depth within the formation. Once the target zone in relation to offset wells 106 and 110 is identified, and also based on the seismic depth volume, one or more "modeled" surfaces are created. Modeled surfaces shall be understood to be a mathematical creation—fictional line or surface—and do not necessarily have any true physical components.

In the illustrative case of FIG. 1, an upper modeled surface 120 may be created which represents the assumed top of the hydrocarbon bearing formation 102. It may be known in advance from the seismic depth volume that the hydrocarbon bearing formation 102 dips in the direction of the viewer in FIG. 1, but because there is not an offset well at the point in the hydrocarbon bearing formation 102 closest to the viewer, the magnitude of the dip may not be precisely known. For this reason, the initial upper modeled surface 120 (defined in part by dashed-dot-dot-dash lines 121) may be initially assumed to have a slight dip, but as illustrated in FIG. 1, the dip may not necessarily match that of the actual formation 102.

In some cases, a lower modeled surface 122 may be created which identifies the assumed lower boundary of the target zone 118. In the illustrative case of FIG. 1, the lower modeled surface is defined in part by dash-dot-dot-dash lines 124. Before proceeding, it should be understood that having both an upper and a lower modeled surface is merely illustrative. The correlations between the measured log and predicted log discussed below may take place in the presence of a single modeled surface, which could be the upper modeled surface in some cases, or just the lower modeled surface.

Based on the modeled surfaces 120 and 122, a plan for a horizontal borehole is made (the proposed trajectory or proposed path 125 is showed by dashed-dot-dash line), with the proposed path of the horizontal borehole to reside just below modeled surface 120 (or in cases where two modeled surfaces are used, between the modeled surfaces). In the illustrative case of FIG. 1, because of inaccuracies in the seismic velocity model, if the horizontal borehole is drilled exactly along the proposed path 125, the distal end of the horizontal borehole will exit the top of the hydrocarbon bearing formation. As discussed more below, however, as the horizontal borehole is being drilled, the relative location within hydrocarbon bearing formation 120 can be determined (based on the marker information), and the direction of the horizontal borehole corrected to take into account the actual dip of the information.

After the proposed path 125 planning has been complete, drilling of a horizontal borehole along the proposed path 125 begins, and the drill string used to create the horizontal borehole may have one or more measuring-while-drilling ("MWD") tools (e.g., inclination sensor, directional sensor) to facilitate measuring actual physical placement with respect to modeled surfaces 120 and 122. That is to say, knowing the vertical depth of the modeled surfaces 120 and 122 at any particular location, and using information gathered by the MWD tools, the horizontal borehole drilled along proposed path 125 can be somewhat accurately placed in relation to the modeled surfaces 120 and 122. Physical placement based on knowledge of the direction and depth of the horizontal borehole as the horizontal borehole is being drilled is not a perfect science, however, and is subject to measurement inaccuracies, undershoot, and overshoot. Thus, some deviation from the proposed path 125 is to be expected in most situations.

The drill string used to create the horizontal borehole along the proposed path 125 may also comprise one more logging-while-drilling ("LWD") tools which create one or more measured logs of formation parameters, the measured logs created contemporaneously with the drilling. While a variety of logging tools may be used, in order to correlate or compare the measured logs to the marker information derived from the offset wells, at least one of the logging tools creates a measured log from which marker information is indicated or can be derived (e.g., a natural gamma tool). At various times, after the horizontal borehole has entered the hydrocarbon bearing formation, the measured log is compared to a predicted log (the predicted log created, at least in part, by the marker information measured within the offset wells). The comparison of the measured log to the predicted log is used to make a determination as to where in the formation the horizontal borehole actually resides and to make corrections to the modeled surfaces (if needed), to make corrections to the seismic velocity model (if needed), and to make corrections to the drilling direction of the horizontal borehole (if needed). Comparing the measured log to the predicted log may be referred to as correlation of the measured log to the predicted log. The predicted log and the correlating are discussed more with respect to FIG. 2.

Figure 2:
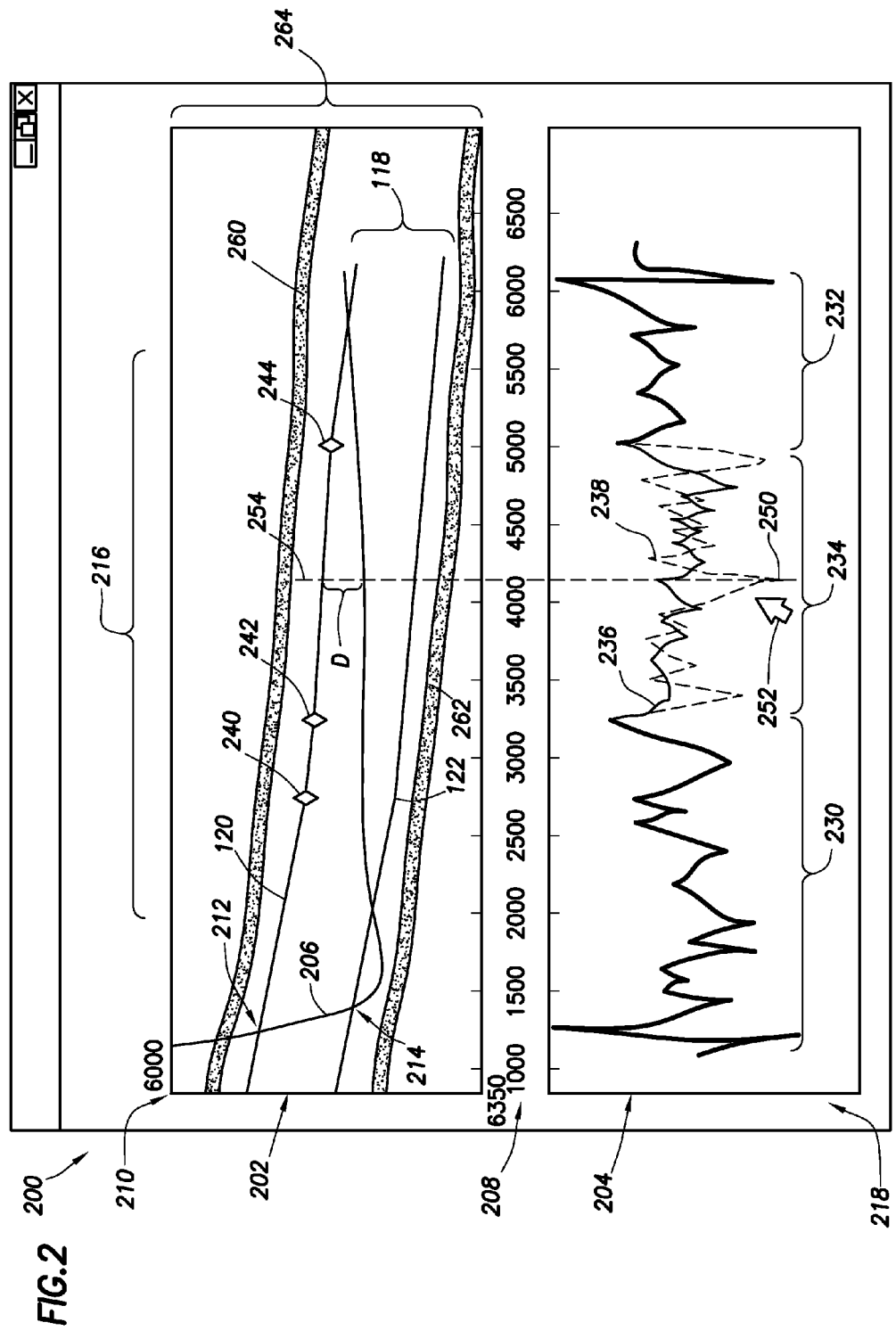
FIG. 2 shows a user interface in accordance with at least some embodiments.

FIG. 2 shows a user interface through which a user can interact with a program to correlate a measured log and a predicted log, to refine the location of a modeled surface, and/or to refine a seismic velocity model. The user interface may be displayed on a display device of a computer system. In particular, the illustrative user interface 200 comprises an upper window or upper pane 202, and a lower pane 204. The lower pane 204 may be referred to as a measured and predicted log window, and the upper pane 202 may be referred to as a borehole and surface pane. Within the background of illustrative upper pane 202 is plotted a two-dimensional cross-sectional view of seismic horizons 260 and 262 from a seismic depth volume. In this example embodiment, only two horizons are shown, although any number of horizons and/or seismic attributes may be plotted. In addition, within upper pane 202 is plotted a two-dimensional view of the upper modeled surface 120 and the lowered modeled surface 122 (e.g., the view taken along lines 2-2 of FIG. 1). That is, in the two-dimensional view of the upper pane 202 of FIG. 2, the upper modeled surface 120 and the lower modeled surface 122 appear as line segments so as not to unduly complicate the figure. Also plotted in the illustrative upper pane 202 is the actual trajectory of the horizontal borehole 206 (the proposed path is not shown), which also appears as a line segment. The portion of the seismic depth model 264 (comprising horizons 260 and 262), the upper modeled surface 120, lower modeled surface 122, and the trajectory of the horizontal borehole 206 are plotted against the abscissa axis 208 illustratively being a distance, and an ordinate axis 210 being depth (with illustrative depth 6000 feet at the top of the pane 202, and 6350 feet at the bottom of the pane).

In the example case plotted in upper pane 202, the horizontal borehole 206 penetrates the upper modeled surface 120 at point 212, and also penetrates the lower modeled surface 122 at point 214. The horizontal borehole 206 thus illustrates an overshot in trying to place the borehole 206 in the target zone 118. Once the horizontal borehole 206 enters again the target zone 118 between the upper modeled surface 120 and the lower modeled surface 122, the distal end of the horizontal borehole 206 illustratively exits the target zone 118. The locations where the borehole 206 penetrates a modeled surface may be referred to as surface picks. That is, a surface pick location is a location at which a borehole actually penetrates a physical location corresponding to a modeled subsurface horizon. The depth of the modeled surface is thus known precisely at the surface pick locations.

Within the illustrative lower pane 204 are plotted values of a measured log, as well as values of a predicted log, with the plotted values appearing as line segments. The measured log and predicted log are plotted against the abscissa axis 208 illustratively being a distance, and an ordinate axis 218 illustratively being magnitude of the values of the logs. Thus, both the measured log and the predicted log are plotted against the same ordinate and abscissa axis. A measured log is a series of values of actually measured or derived formation parameters (e.g., values measured by a LWD tool within the horizontal borehole 206). Any suitable formation parameter may be measured and used for the measured log, but in some embodiments, the measured parameter may be natural gamma radiation or electrical resistivity.

The predicted log, by contrast, is a modeled or synthetic log created from values of the measured parameter at offset wells 106 and 110, taking into account dip of the hydrocarbon bearing formation. Stated otherwise, each value of the predicted log is a valued expected to be measured at each particular location along the trajectory of the horizontal borehole 206 taking into account the distance the borehole 206 is above or below a geological feature represented by the modeled surfaces. However, as discussed above, the dip of the portions of the modeled surfaces between offset wells may not match the actual dip of the hydrocarbon bearing formation 102 because of inaccuracies in the seismic velocity model. More particularly, the dip of the modeled surfaces may not match the actual dip of the formation at each position (or depth) because of cumulative difference in dip along the length of the planned borehole, which, in combination 'carry' the actual depth to deeper or shallower positions as compared to the model surfaces. When the cumulative dips of the modeled surface accurately matches the cumulative dips of the hydrocarbon bearing formation 102, the measured log and predicted log should (in theory) fully overlap. Measurement inaccuracies, and inaccuracies in interpolation (due to structural complexity) may cause the data to not precisely align point-for-point; however, major features of the measured log and predicted log should substantially align when the cumulative dips of the modeled surfaces accurately matches the actual cumulative dips of the hydrocarbon bearing formation.

With the various issues regarding overlap of the measured log and predicted log in mind, reference is again made to the lower pane 204 of the user interface 200 of FIG. 2. For purposes of explanation, in FIG. 2, portions of the measured log and predicted log have already been correlated. In particular, portion 230 and portion 232 have been correlated, and thus the measured log and predicted log overlap in these regions (the overlap shown by the heavy, dark line). When the measured log and predicted log are correlated, a fixed point or marker may then be created in one or both of the modeled surfaces. The fixed point represents a location (e.g., an X, Y, Z location in Cartesian Space) where the modeled surface is presumed to accurately match the geological boundary of interest, and thus future adjustments to the modeled surface do not affect or change at the fixed point. Three illustrative fixed points are shown in the upper pane 202—fixed points 240, 242, and 244. However, in portion 234, the measured log 236 (solid line) and predicted log 238 (dashed line) do not overlap (i.e., are not correlated). Thus, within the portion 234, the measured log 236 and predicted log 238 need to be correlated.

Correlation in accordance with various embodiments involves selecting an inflection point in the predicted log 238. The inflection point selected may be a maxima, a minima, or just an inflection point between a set of maxima and minima. For purposes of explanation, consider that a user (e.g., a geologist) would like to select the inflection point 250. Selection of the inflection point may take many forms. In some embodiments, a pointing attribute 252 (illustratively shown as an arrow) may be moved about the display device responsive to a pointing device (e.g., mouse, or touch-screen overlaying the display device). Based on the location of the pointing attribute 252 being placed on or near the inflection point 250, and possibly other action (e.g., mouse click), the inflection point is selected. In the illustration of FIG. 2, the selected inflection point represents a value of the predicted log at a particular distance D below the upper modeled surface 120 (the correlation between the inflection point 250, upper modeled surface, and distance D shown in relation to dashed line 254). When the value of the selected inflection point 250 does not match or overlay the measured log, such indicates that the local dip of the modeled surface (and correspondingly the seismic depth volume) does not accurately match the actual dip of the hydrocarbon bearing formation 102.

Once a particular inflection point is selected, a correlation may be made by moving the inflection point left or right on the screen—that is, shifting the horizontal position of the inflection point. At a high level, the user shifts the inflection point until a match of the predicted log 238 and measured log 236 is found. The specification first discusses the visual aspects of shifting the horizontal location of the inflection point 250 within the lower pane 204, and then discusses conceptually the changes to the modeled surfaces and seismic velocity model responsive to shifting of the inflection point 250.

With respect to the visual aspects within the lower pane 204, shifting the horizontal position of the inflection point 250 correspondingly shifts the predicted log 238. Consider, for example, the portion of the predicted log 238 between the inflection point 250 and the portion corresponding to fixed point 242. Shifting the infection point 250 in the direction of the fixed point 242 causes the portion of the predicted log 238 to contract, with plotted values of the predicted log 238 closer to the fixed point 242 moving less than plotted values of the predicted log 238 close to the inflection point. Likewise, shifting the inflection point 250 away from the fixed point 242 causes the portion of the predicted log 238 to expand, though still with plotted values of the predicted log 238 closer to the fixed point 242 moving less than plotted values of the predicted log 238 close to the inflection point. The portion of the predicted log between the inflection point 250 and fixed point 244 expands and compresses oppositely in this example. In the illustrative case of FIG. 2, portion 234 of the predicted log 238 that remains uncorrelated resides between two fixed points (fixed points 242 and 244), and thus movement of the inflection point 250 causes changes to the portion 234 between fixed points 242 and 244, but portions 230 and 232 remain unchanged.

In some embodiments, changes to the predicted log responsive to the shifting of the inflection point 250 are animated. That is, the display device on which the user interface 200 is displayed is updated at about 15 frames a second or greater such that the compression and/or expansion of the predicted log 238 responsive to movement of the inflection point appears to be a smooth change. In other cases, particularly situations where the frame rate is limited or where the processing power of the underlying computer system is limited, the predicted log 238 may not be redrawn until movement of the inflection point stops of the inflection points is deselected (i.e., dropped in the drag-and-drop operation).

The visual aspects of the changes in the predicted log 238 responsive to horizontally shifting the inflection point 250 are actually a consequence of changing the dip of one or both of the modeled surfaces 120 and 122. Still referring to FIG. 2, and particularly the upper frame 202, each value or point on the predicted log represents a value related to the distance or depth D. When the inflection point 250 does not overlay or correspond to the measured log 236, such a lack of correspondence means that the dip of the modeled surface may not match that of the actual formation. Shifting of the inflection point thus can be thought of as changing the dip of the modeled surface 120 until the predicted log 238 overlays or matches the measured log 236. In these embodiments, the distance or depth D remains constant, but is shifted responsive to shifting of the inflection point. In other words, the distance between representation of D remains constant, but is shifted responsive to shifting of the inflection point. Stated otherwise again, the distance between representation of the horizontal borehole 206 and the modeled surface (here the upper modeled surface 120) at the horizontal location of the inflection point 250 remains constant as the inflection point 250 is shifted (in the lower pane 204). The shifting and constant depth D results in changes in the dip of the modeled surface, and corresponding changes in the predicted log.

Figure 3:
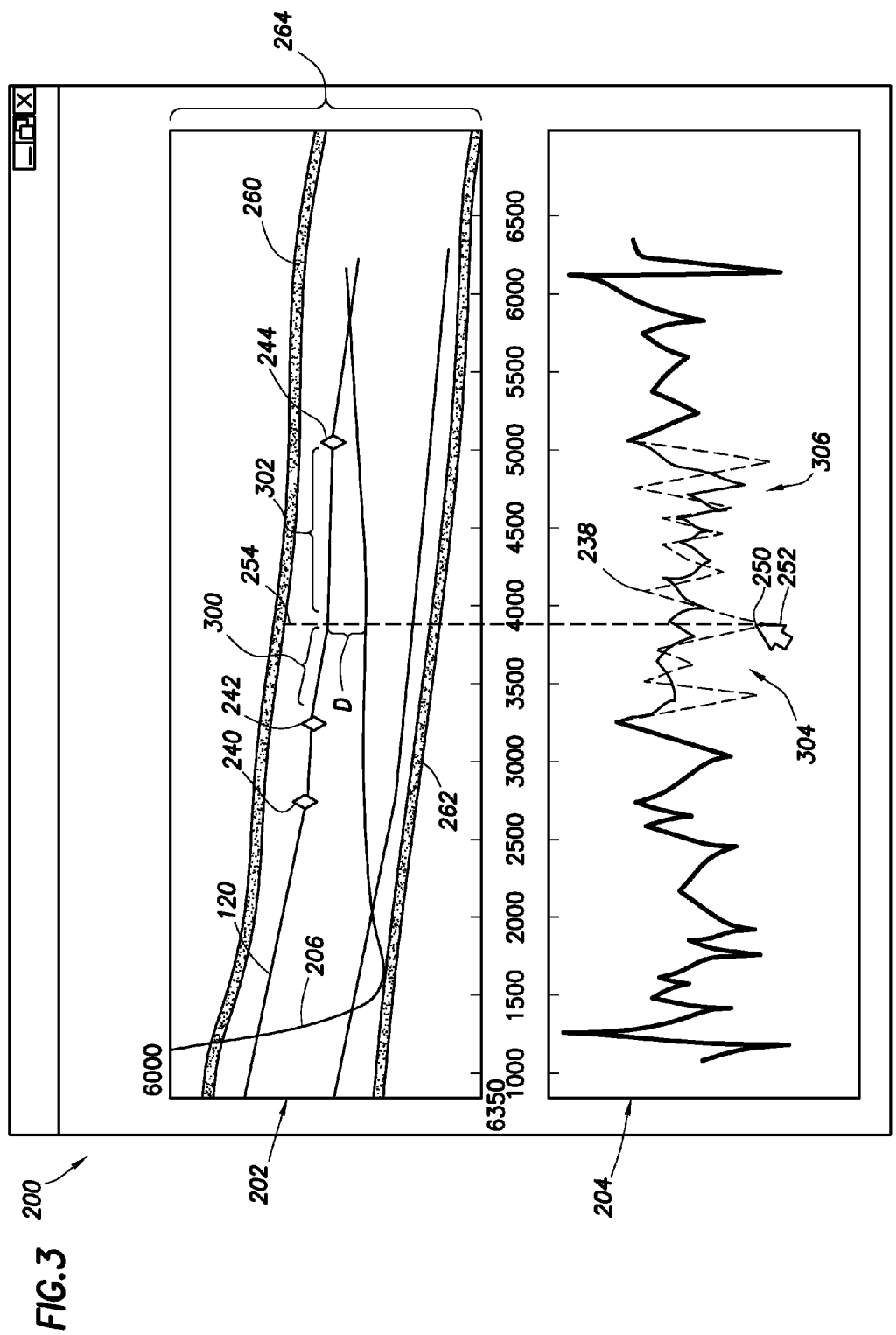
FIG. 3 shows a user interface in accordance with at least some embodiments.

FIG. 3 shows a view of the user interface 200 similar to that of FIG. 2, but illustratively shows the inflection point 250 shifted to the left from that of FIG. 2. Shifting the inflection point 250 to the left, but holding the depth D constant, results in changes in dip of the upper modeled surface 120. In particular, portion 300 of the modeled surface 120 dips from fixed point 242 to the corresponding location of the inflection point 250 (correlated by dashed line 254), and the dip has greater magnitude than that of FIG. 2. Likewise for portion 302 of the upper modeled surface, portion 302 of the modeled surface 120 dips from fixed point 244 to the corresponding location of the inflection point 250, and the dip has greater magnitude that that of FIG. 2. FIG. 3 also illustrates that in changing the dip of the upper modeled surface 120, the corresponding portions of the predicted log change. Portion 304 has the appearance of contraction in relation to the corresponding portion of FIG. 2, while portion 306 has the appearance of expansion in relation to the corresponding portion in FIG. 2. In some cases, however, the predicted log 238 in the lower pane 204 is recalculated with each new dip adjustment shown in the upper pane 202, and the recalculation gives the appearance of expansion and contraction of the predicted log 238.

Figure 4:
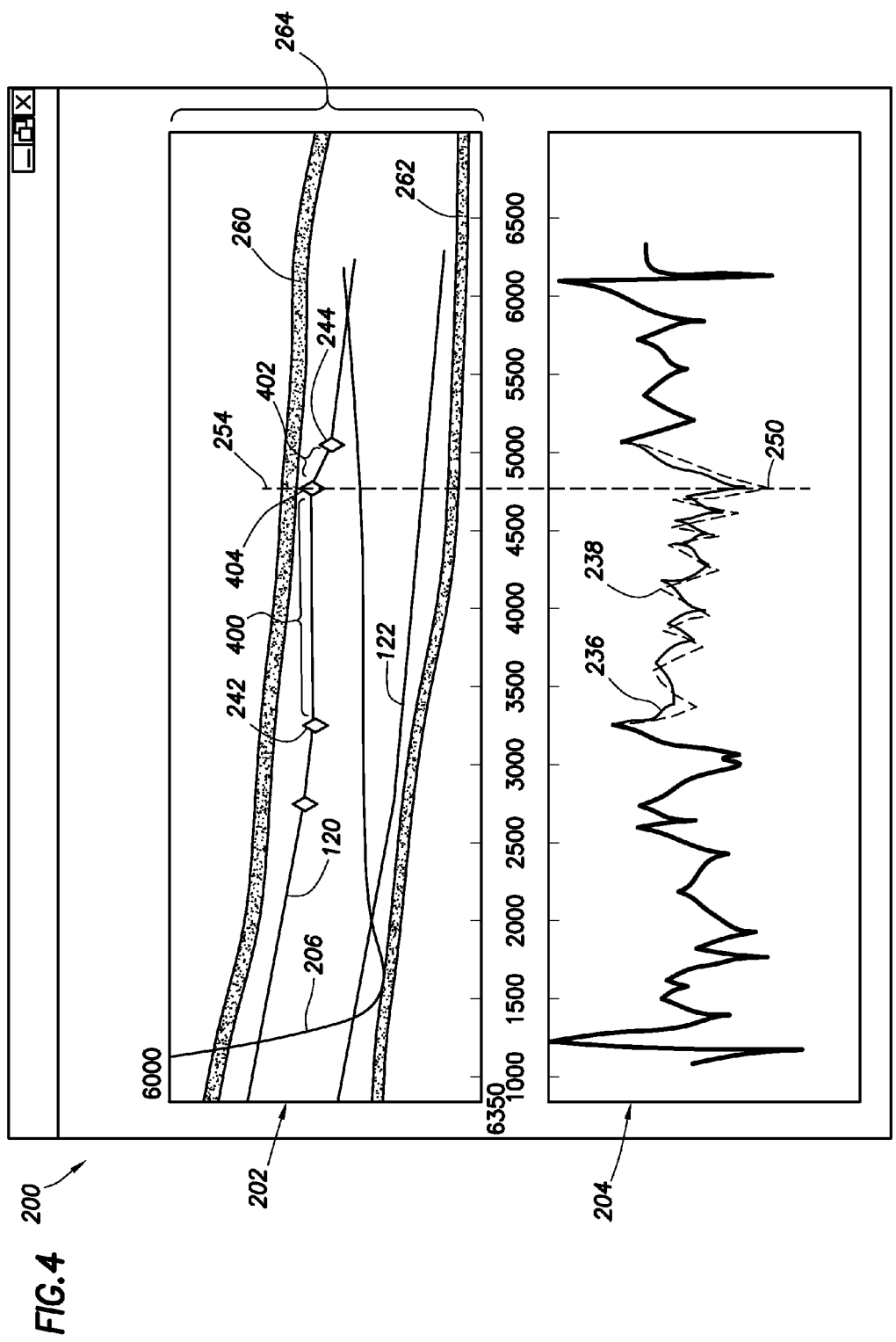
FIG. 4 shows a user interface in accordance with at least some embodiments.

FIG. 4, however, shows a view of the user interface 200 similar to that of FIG. 2, but illustratively shows the inflection point 250 shifted to the right from that of FIG. 2. In particular, for portion 400 of the modeled surface 120, the dip has decreased from fixed point 242 to the corresponding location of the inflection point 250 (correlated by dashed line 254). Likewise, for portion 402 of the upper modeled surface, for potion 402 of the modeled surface 120 the dip has increased from fixed point 244 to the corresponding portions of the predicted log 238 in the lower pan 204. The changes in the predicted log 238 caused by the illustrative changes in the dip make the predicted log 238 and measured log 236 overlay, and thus correlate. Given the substantial correlation, the user may "drop" the inflection point at the shifted location, thus creating a new fixed point 404 within the modeled surface 120.

A few points before proceeding: firstly, notice how the illustrative fixed point 404 modifies the modeled surface 120. In particular, initially at least, inserting a fixed point into the modeled surface results in straight-line changes between points—a straight line connects fixed point 242 and fixed point 404, and a straight line connects fixed point 404 and fixed point 244. Further, initially at least, the changes implemented to the modeled surface 120 are bounded by fixed points—the new fixed point 404 does not affect the modeled surface beyond (here, to the right of) fixed point 244. Further notice that the new fixed point 404 and corresponding modeled surface 120 no longer match the horizon 260 of the seismic depth volume 264.

As discussed previously, modeled surfaces 120 and 122 are created, at least in part, by data from the seismic depth volume 264 (and in particular horizons 260 and 262 within the seismic depth volume 264). When a fixed point is placed in a modeled surface that changes the dip of the modeled surface, the change is indicative of inaccuracies in the seismic velocity model used to create the seismic depth volume. Thus, in accordance with various embodiments, once a fixed point is placed in a modeled surface, the computer system updates the seismic velocity model, recalculates the seismic depth volume so that the corresponding horizon in the seismic depth model is corrected, and in some cases recalculates the modeled surface based on the updated horizon or horizons. Stated otherwise, a new fixed point in the modeled surface is treated similarly to a surface pick from the standpoint of location of the modeled surface (and thus the fixed point may be referred to as a pseudo-surface pick). The pseudo-surface pick is a time/depth pair which uses the depth measured in the well and the time of the seismic horizon. Based on the pseudo-surface pick, other time/depth pairs in the seismic velocity model may be updated, and/or additional time/depth pairs added to the seismic velocity model.

Figure 5:
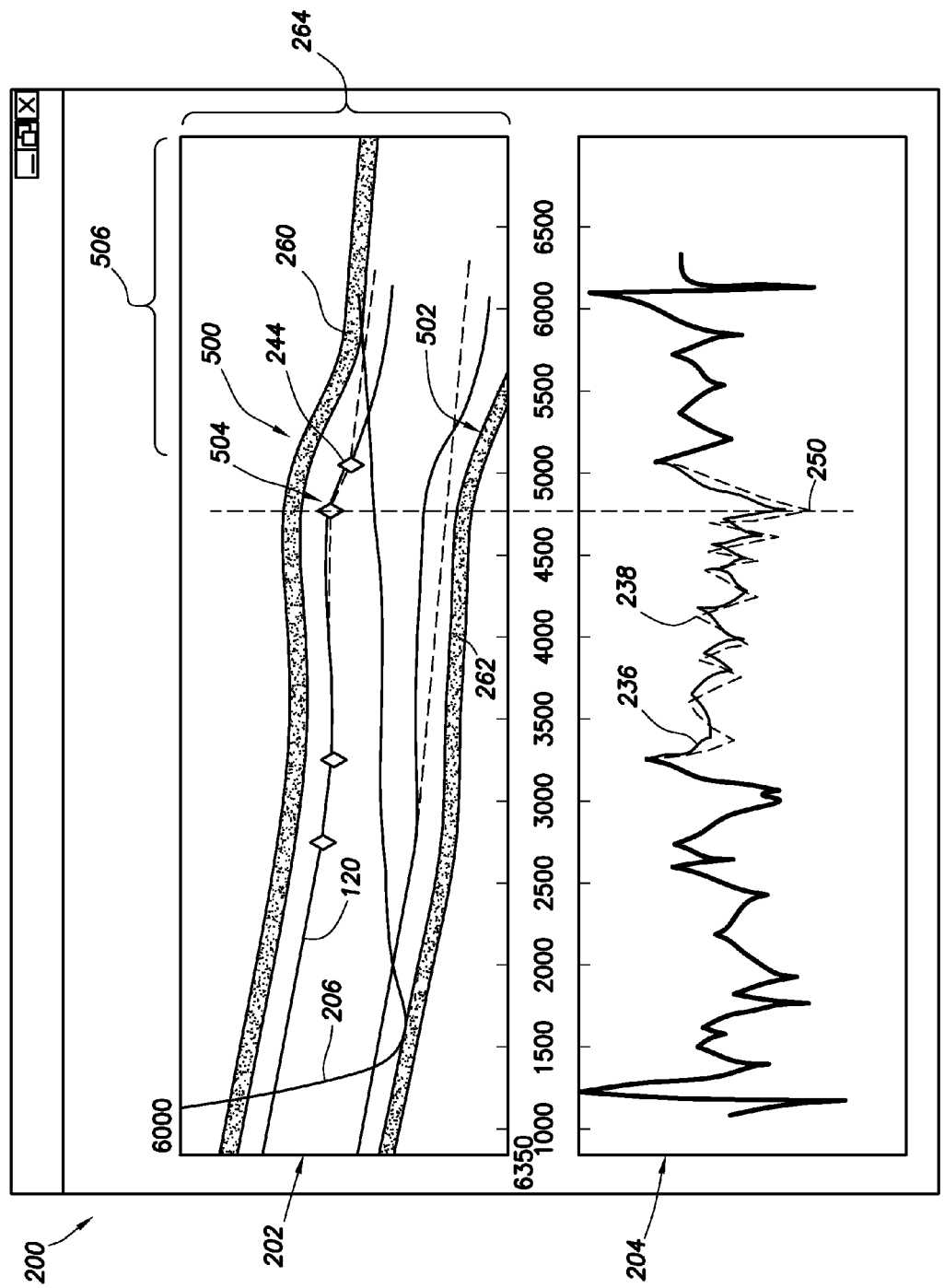
FIG. 5 shows a user interface in accordance with at least some embodiments.

FIG. 5 shows a view of the user interface 200 similar to that of FIG. 4, but illustratively shows recalculated seismic depth volume and recalculated modeled surfaces. In particular, in the view of FIG. 5, the computer system has modified at least a portion of the seismic velocity model based on the pseudo-surface pick, recalculated the seismic depth volume based on the seismic velocity model, and plotted modified horizons 260 and 262. Notice the illustrative dipping portion 500 in the horizon 260 and corresponding dipping portion 502 in the horizon 502. Further still, in the view of FIG. 5, the computer system has recalculated the modeled surfaces 120 and 122 based on the updated horizons 260 and 262. In particular, the modeled surface 120 now more closely matches the horizon 260, and also the modeled surface 120 is no longer constrained to straight lines between fixed points. That is, modeled surface 120 now has non-linear or curved portions 504 corresponding to the horizon 260. For purposes of illustration, the straight line portions of the modeled surface 120 prior to recalculation are shown in dashed lines.

Moreover, FIG. 5 illustrates that changes to the seismic velocity model may also change portions of the modeled surfaces beyond fixed points. For example, in zone 506, residing beyond the fixed point 244, the updated seismic depth volume may be used to recalculate the modeled surface 120. The recalculated modeled surface 120 beyond the fixed point 244 is shown in as a solid line, while the previous version of the modeled surface 120 beyond the fixed point 244 is shown as a dashed line to illustrate the change in this particular example. Stated otherwise, refining the seismic velocity model further provides information related to the modeled surfaces beyond the fixed points. With the new information regarding the modeled surfaces, the drilling direction of the borehole 206 may be modified accordingly, in this illustrative case to turn to again reside between the modeled surfaces 120 and 122.

In some embodiments, changes to the modeled surfaces responsive to the shifting of the inflection point 250 are animated. That is, the display device on which the user interface 200 is displayed is updated at about 15 frames a second or greater such that the changes to the modeled surfaces responsive to movement of the inflection point appear to be smooth changes. In other cases, particularly situations where the frame rate is limited or where the processing power of the underlying computer system is limited, the modeled surfaces may not be redrawn until movement of the inflection point stops or the inflection point is deselected (i.e., dropped in the drag-and-drop operation).

Further still, in some embodiments changes to the seismic velocity model (and thus the seismic depth volume) responsive to the placing of fixed points within the modeled surfaces are made in real-time. That is, the display device on which the portion of the seismic depth volume is displayed is updated in real-time when a new fixed point is placed in a modeled surface. It follows that recalculating the modeled surface based on the updated seismic velocity model takes place in real-time, and in some cases the changes are animated. In other cases, particularly situations where the size of the seismic depth volume is large and/or where the processing power of the underlying computer system is limited, the updated seismic depth volume may be redrawn at a later time, such as after several fixed points have been located.

Figure 6:
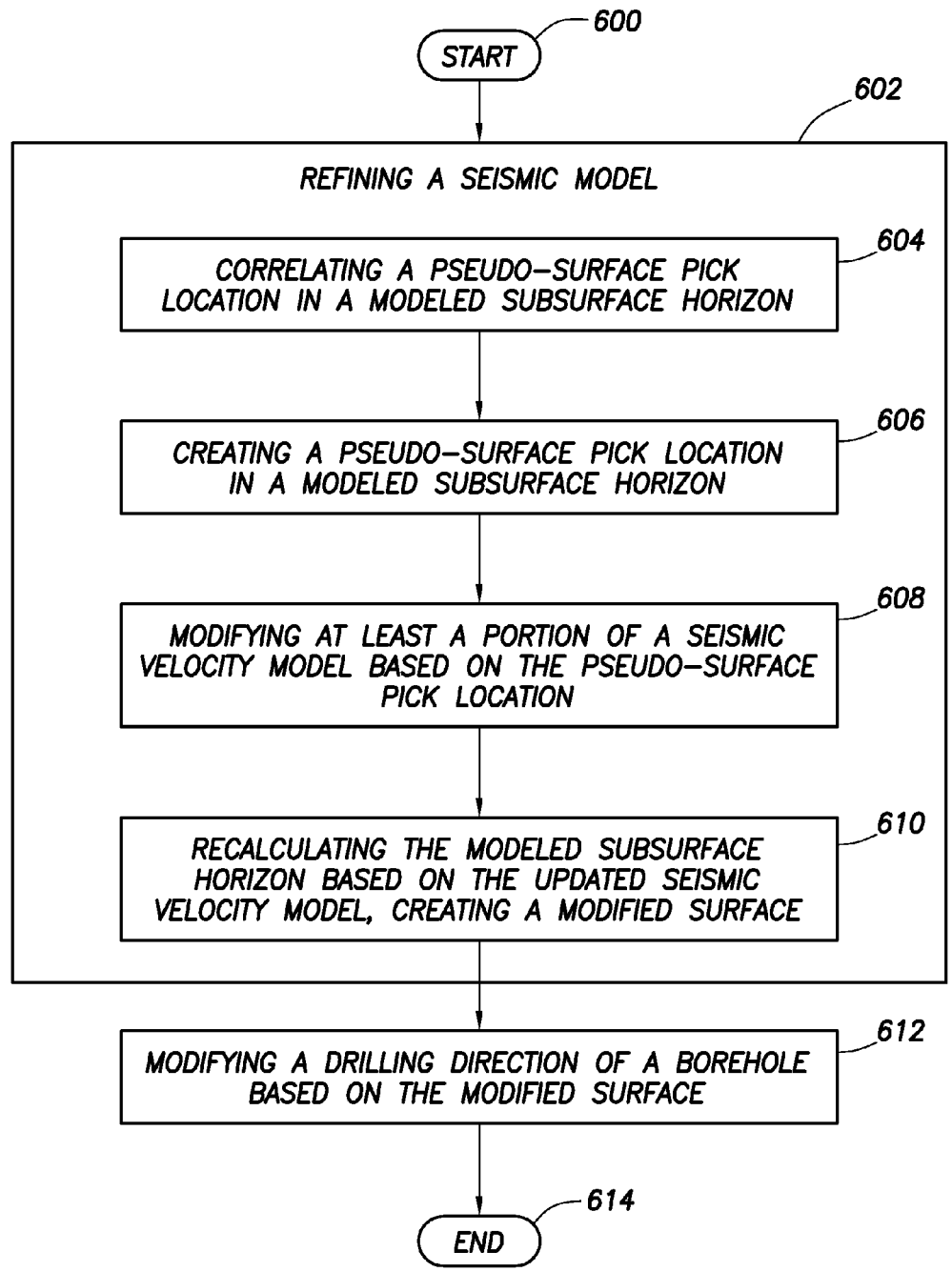
FIG. 6 shows a method in accordance with at least some embodiments.

FIG. 6 shows a method in accordance with at least some embodiments, and some of which may be implemented by way of computer instructions. In particular, the method starts (block 600) and comprises refining a seismic model (block 602). In some cases, refining may comprise correlating a predicted log to a measured log (block 604). The method may then comprise creating a pseudo-surface pick location in a modeled subsurface horizon (block 606); modifying at least a portion of the seismic velocity used in the seismic velocity model based on the pseudo-surface pick location (block 608), and then recalculating the modeled subsurface horizon based on the seismic velocity model, creating a modified surface (block 610). After the seismic model has been refined, the method moves to modifying the drilling direction of a borehole based on the modified surface (block 612). Thereafter, the method ends (block 614), possibly to be restarted.

Figure 7:
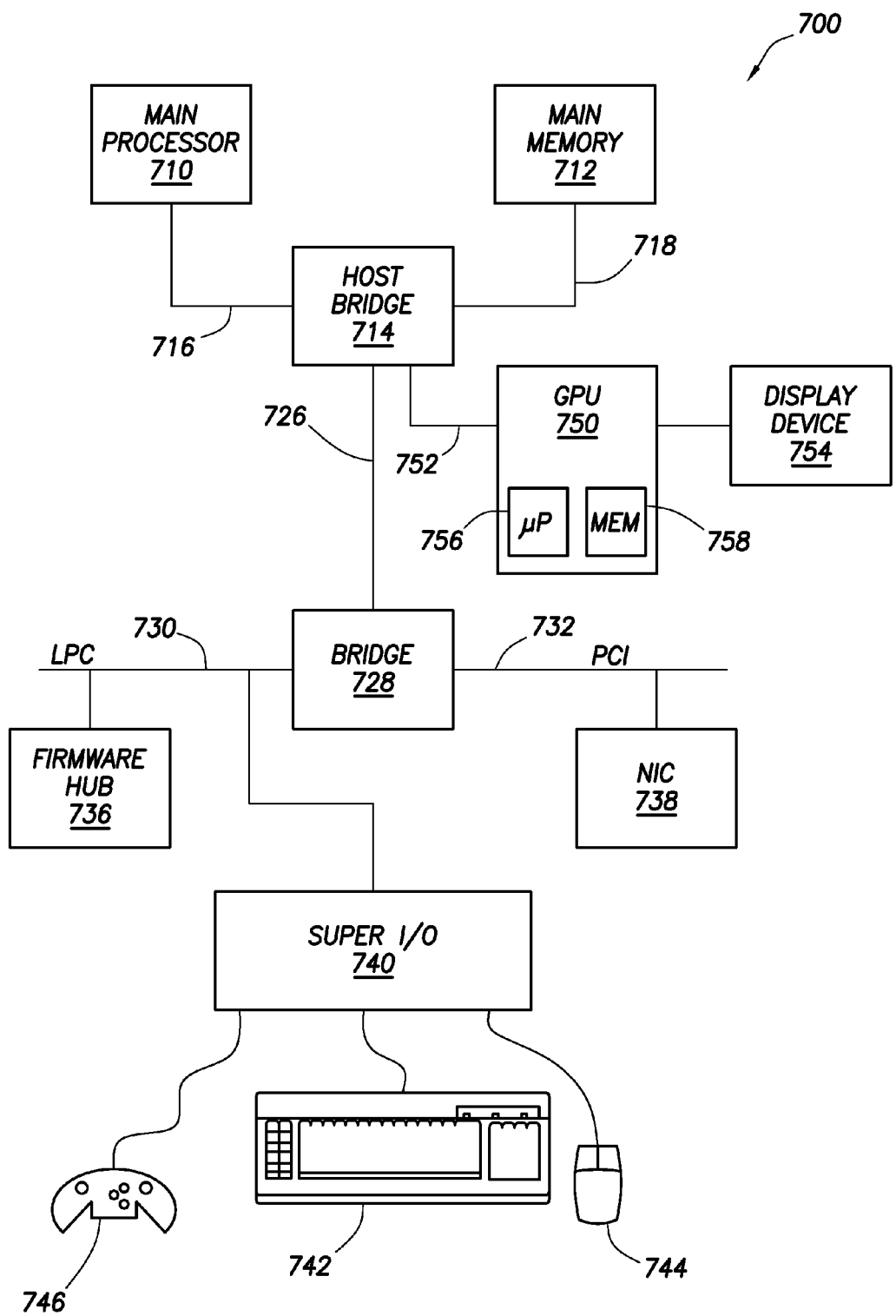
FIG. 7 shows a computer system in accordance with at least some embodiments.

FIG. 7 illustrates a computer system 700 in accordance with at least some embodiments. Any or all of the embodiments that involve use of a user interface, or a computer system to perform calculations, may be implemented on a computer system such as that shown in FIG. 7. In particular, computer system 700 comprises a main processor 710 coupled to a main memory array 712, and various other peripheral computer system components, through integrated host bridge 714. The main processor 710 may be a single processor core device, or a processor implementing multiple processor cores. Furthermore, computer system 700 may implement multiple main processors 710. The main processor 710 couples to the host bridge 714 by way of a host bus 716, or the host bridge 714 may be integrated into the main processor 710. Thus, the computer system 700 may implement other bus configurations or bus-bridges in additional to, or in place of, those shown in FIG. 7.

The main memory 712 couples to the host bridge 714 through a memory bus 718. Thus, the host bridge 714 comprises a memory control unit that controls transactions to the main memory 712 by asserting control signals for memory accesses. In other embodiments, the main processor 710 directly implements a memory control unit, and the main memory 712 may couple directly to the main processor 710. The main memory 712 functions as the working memory for the main processor 710 and comprises a memory device or array of memory devices in which programs, instructions and data are stored. The main memory 712 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 712 is an example of a non-transitory computer-readable medium storing programs and instructions, and other examples are disk drives and flash memory devices.

The illustrative computer system 700 also comprises a second bridge 728 that bridges the primary expansion bus 726 to various secondary expansion buses, such as a low pin count (LPC) bus 730 and peripheral components interconnect (PCI) bus 732. Various other secondary expansion buses may be supported by the bridge device 728.

Firmware hub 736 couples to the bridge device 728 by way of the LPC bus 730. The firmware hub 736 comprises read-only memory (ROM) which contains software programs executable by the main processor 710. The software programs comprise programs executed during and just after power on self-tests (POST) procedures as well as memory reference code. The POST procedures and memory reference code perform various functions within the computer system before control of the computer system is turned over to the operating system. The computer system 700 further comprises a network interface card (NIC) 738 illustratively coupled to the PCI bus 732. The NIC 738 acts as to couple the computer system 700 to a communication network, such the Internet.

Still referring to FIG. 7, computer system 700 may further comprise a super input/output (I/O) controller 740 coupled to the bridge 728 by way of the LPC bus 730. The Super I/O controller 740 controls many computer system functions, for example interfacing with various input and output devices such as a keyboard 742, a pointing device 744 (e.g., mouse), a pointing device in the form of a game controller 746, various serial ports, floppy drives and disk drives. The super I/O controller 740 is often referred to as "super" because of the many I/O functions it performs.

The computer system 700 may further comprise a graphics processing unit (GPU) 750 coupled to the host bridge 714 by way of bus 752, such as a PCI Express (PCI-E) bus or Advanced Graphics Processing (AGP) bus. Other bus systems, including after-developed bus systems, may be equivalently used. Moreover, the graphics processing unit 750 may alternatively couple to the primary expansion bus 726, or one of the secondary expansion buses (e.g., PCI bus 732). The graphics processing unit 750 couples to a display device 654 which may comprise any suitable electronic display device upon which any image or text can be plotted and/or displayed. The graphics processing unit 750 may comprise an onboard processor 756, as well as onboard memory 758. The processor 756 may thus perform graphics processing, as commanded by the main processor 710. Moreover, the memory 758 may be significant, on the order of several hundred megabytes or more. Thus, once commanded by the main processor 710, the graphics processing unit 750 may perform significant calculations regarding graphics to be displayed on the display device, and ultimately display such graphics, without further input or assistance of the main processor 710.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

It is noted that while theoretically possible to perform some or all the calculations, simulations, and/or modeling by a human using only pencil and paper, the time measurements for human-based performance of such tasks may range from man-days to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

References to "one embodiment", "an embodiment", "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, the various embodiments have been discussed in terms of refining a seismic velocity model by adding pseudo-surface points; however, the application is not limited to just that embodiment. In addition, while correlation has illustratively been described in terms of a horizontal orientation, correlation may also be accomplished in a vertical orientation. It is intended that the following claims be interpreted to embrace any and all such variations and modifications.

We claim:

1. A computer-implemented method of refining models of subsurface formations targeted for hydrocarbon exploration and recovery, the method comprising:
   modeling, by a computer system, at least one surface of a subsurface formation based on a seismic velocity model of the subsurface formation and measurements of formation properties from one or more offset wells, the modeled surface representing a boundary of a target zone corresponding to a location of a hydrocarbon reservoir within the subsurface formation;
   planning a trajectory of a borehole to be drilled toward the target zone within the subsurface formation, based on the modeled surface;
   correlating a predicted log generated using the measurements obtained from the one or more offset wells to a measured log of formation properties obtained from the borehole while it is drilled along the planned trajectory within the subsurface formation;
   determining a pseudo-surface pick location for the modeled surface based on the correlating, the pseudo-surface pick location representing a point at which the borehole being drilled is expected to penetrate the boundary of the target zone represented by the model surface;
   modifying at least a portion of the seismic velocity model based on the determined pseudo-surface pick location of the modeled surface;
   updating at least a portion of the modeled surface based on the modified portion of the seismic velocity model; and
   adjusting the planned trajectory of the borehole as it is being drilled toward the target zone within the subsurface formation, based on the updated portion of the modeled surface.

2. The method of claim 1, wherein adjusting the planned trajectory comprises modifying a drilling direction and a depth of the borehole as it is being drilled toward the target zone within the subsurface formation, based on the updated portion of the modeled surface.

3. The method of claim 1, wherein updating the portion of the modeled surface comprises updating the modeled surface at modeled locations that reside beyond previously placed surface pick locations and beyond previously placed pseudo-surface pick locations.

4. The method of claim 1, wherein modeling the surface of the subsurface formation comprises:
   applying the seismic velocity model to seismic volume data from a seismic survey to calculate a seismic depth volume for the subsurface formation;
   determining locations of one or more subsurface horizons relative to the target zone within the subsurface formation based on the seismic depth volume; and
   modeling one or more surfaces of the subsurface formation based on the determined locations of the one or more subsurface horizons.

5. The method of claim 4, wherein adjusting the modeled surface comprises:
   recalculating the seismic depth volume based on the modified seismic velocity model;
   updating the locations of the one or more subsurface horizons within the subsurface formation based on the recalculated seismic depth volume; and
   adjusting the modeled surface based on the updated locations.

6. The method of claim 1, wherein modifying the portion of the seismic velocity model comprises modifying the seismic velocity model in real-time responsive to the determination of the pseudo-surface pick location.

7. The method of claim 6, wherein:
   the predicted log is correlated to the measured log based on input received from a user of the computer system via a user interface of a program executable at the computer system;
   the user interface is displayed on a display device of the computer system;
   the user interface includes a first pane displaying a cross-sectional view of the subsurface formation including the modeled surface relative to one or more seismic horizons and an actual trajectory of the borehole being drilled toward the target zone; and
   the user interface further includes a second pane displaying respective plots of the predicted log and the measured log according to the borehole's actual trajectory within the subsurface formation relative to the modeled surface.

8. The method of claim 7, further comprising:
   receiving input from the user selecting an inflection point for the predicted log via the corresponding plot displayed in the second pane of the user interface;
   receiving, via the second pane of the user interface, input from the user shifting a horizontal position of the selected inflection point of the predicted log relative to the measured log, wherein the seismic velocity model is modified according to the shifted horizontal position of the inflection point; and
   updating the portion of the modeled surface displayed within the first pane of the user interface as the portion of the seismic velocity model is modified in response to the input received from the user via the second pane.

9. The method of claim 8, wherein changes to the displayed portion of the modeled surface within the first pane of the user interface are animated in real-time with the shifting of the horizontal position of the inflection point by the user via the second pane of the user interface.

10. A computer system comprising:
    a processor;
    a display device coupled to the processor; and
    a memory coupled to the processor, the memory storing a program that, when executed by the processor, causes the processor to perform a plurality of functions, including functions to:
    model at least one surface of a subsurface formation based on a seismic velocity model of the subsurface formation and measurements of formation properties from one or more offset wells, the modeled surface representing a boundary of a target zone corresponding to a location of a hydrocarbon reservoir within the subsurface formation;
    plan a trajectory of a borehole to be drilled toward the target zone within the subsurface formation, based on the modeled surface;

correlate a predicted log generated using the measurements obtained from the one or more offset wells to a measured log of formation properties obtained from the borehole while it is drilled along the planned trajectory within the subsurface formation;

determine a pseudo-surface pick location for the modeled surface based on the correlation, the pseudo-surface pick location representing a point at which the borehole being drilled is expected to penetrate the boundary of the target zone represented by the model surface;

modify at least a portion of the seismic velocity model based on the pseudo-surface pick location of the modeled surface;

update at least a portion of the modeled surface based on the modified portion of the seismic velocity model; and adjust the planned trajectory of the borehole as it is being drilled toward the target zone within the subsurface formation, based on the updated portion of the modeled surface.

11. The system of claim 10, wherein the modeled surface is updated at modeled locations that reside beyond previously placed surface pick locations and beyond previously placed pseudo-surface pick locations.

12. The system of claim 10, wherein the functions performed by the processor include functions to modify a depth and a drilling direction of the borehole as it is being drilled toward the target zone within the subsurface formation, based on the modified portion of the modeled surface.

13. The system of claim 10, wherein the functions performed by the processor further include functions to:
   apply the seismic velocity model to seismic volume data from a seismic survey to calculate a seismic depth volume for the subsurface formation;
   determine locations of one or more subsurface horizons relative to the target zone within the subsurface formation based on the seismic depth volume; and
   model one or more surfaces of the subsurface formation based on the determined locations of the one or more subsurface horizons.

14. The system of claim 13, wherein the functions performed by the processor further include functions to:
   recalculate the seismic depth volume based on the modified seismic velocity model;
   update the locations of the one or more subsurface horizons within the subsurface formation based on the recalculated seismic depth volume; and
   adjust the modeled surface based on the updated locations.

15. The system of claim 10, wherein the portion of the seismic velocity model is modified in real-time in response to the determination of the pseudo-surface pick location.

16. The system of claim 10, wherein the predicted log is correlated to the measured log based on input received from a user via a user interface displayed on the display device, the user interface includes a first pane displaying a cross-sectional view of the subsurface formation including the modeled surface relative to one or more seismic horizons and an actual trajectory of the borehole being drilled toward the target zone, and the user interface further includes a second pane displaying respective plots of the predicted log and the measured log according to the borehole's actual trajectory within the subsurface formation relative to the modeled surface.

17. The system of claim 16, wherein the functions performed by the processor further include functions to:
   receive input from the user selecting an inflection point for the predicted log via the corresponding plot displayed in the second pane of the user interface;
   receive, via the second pane of the user interface, input from the user shifting a horizontal position of the selected inflection point of the predicted log relative to the measured log, wherein the seismic velocity model is modified according to the shifted horizontal position of the inflection point; and
   update the portion of the modeled surface displayed within the first pane of the user interface as the portion of the seismic velocity model is modified in response to the input received from the user via the second pane of the user interface displayed on the display device.

18. The system of claim 17, wherein changes to the displayed portion of the modeled surface within the first pane of the user interface are animated in real-time with the shifting of the horizontal position of the inflection point by the user via the second pane of the user interface.

19. A non-transitory computer-readable medium that, when executed by a processor, causes the processor to perform a plurality of functions, including functions to:
   model at least one surface of a subsurface formation based on a seismic velocity model of the subsurface formation and measurements of formation properties from one or more offset wells, the modeled surface representing a boundary of a target zone corresponding to a location of a hydrocarbon reservoir within the subsurface formation;
   plan a trajectory of a borehole to be drilled toward the target zone within the subsurface formation, based on the modeled surface;
   correlate a predicted log generated using the measurements obtained from the one or more offset wells to a measured log of formation properties obtained from the borehole while it is drilled along the planned trajectory within the subsurface formation;
   determine a pseudo-surface pick location for the modeled surface based on the correlation, the pseudo-surface pick location representing a point at which the borehole being drilled is expected to penetrate the boundary of the target zone represented by the model surface;
   modify at least a portion of the seismic velocity used in seismic velocity model based on the pseudo-surface pick location;
   update at least a portion of the modeled surface based on the modified portion of the seismic velocity model; and
   adjust the planned trajectory of the borehole as it is being drilled toward the target zone within the subsurface formation, based on the updated portion of the modeled surface.

20. The non-transitory computer-readable medium of claim 19, wherein the functions performed by the processor include functions to modify a depth and a drilling direction of the borehole as it is being drilled toward the target zone within the subsurface formation, based on the modified portion of the modeled surface.

21. The non-transitory computer-readable medium of claim 19, wherein the modeled surface is updated at modeled locations that reside beyond previously placed surface pick locations and beyond previously placed pseudo-surface pick locations.

22. The non-transitory computer-readable medium of claim 19, wherein the functions performed by the processor further include functions to:
   apply the seismic velocity model to seismic volume data from a seismic survey to calculate a seismic depth volume for the subsurface formation;

determine locations of one or more subsurface horizons relative to the target zone within the subsurface formation based on the seismic depth volume; and model one or more surfaces of the subsurface formation based on the determined locations of the one or more subsurface horizons.

23. The non-transitory computer-readable medium of claim 22, wherein the functions performed by the processor further include functions to:

recalculate the seismic depth volume based on the modified seismic velocity model;

update the locations of the one or more subsurface horizons within the subsurface formation based on the recalculated seismic depth volume; and adjust the modeled surface based on the updated locations.

24. The non-transitory computer-readable medium of claim 19, wherein the portion of the seismic velocity model is modified in real-time in response to the determination of the pseudo-surface pick location.

25. The non-transitory computer-readable medium of claim 24, wherein:

the predicted log is correlated to the measured log based on input received from a user of the computer system via a user interface of a program executable at a computer system of the user;

the user interface is displayed on a display device of the computer system;

the user interface includes a first pane displaying a cross-sectional view of the subsurface formation including the modeled surface relative to one or more seismic horizons and an actual trajectory of the borehole being drilled toward the target zone; and the user interface further includes a second pane displaying respective plots of the predicted log and the measured log according to the borehole's actual trajectory within the subsurface formation relative to the modeled surface.

26. The non-transitory computer-readable medium of claim 25, wherein the functions performed by the processor further include functions to:

receive input from the user selecting an inflection point for the predicted log via the corresponding plot displayed in the second pane of the user interface;

receive, via the second pane of the user interface, input from the user shifting a horizontal position of the selected inflection point of the predicted log relative to the measured log, wherein the seismic velocity model is modified according to the shifted horizontal position of the inflection point; and update the portion of the modeled surface displayed within the first pane of the user interface as the portion of the seismic velocity model is modified in response to the input received from the user via the second pane of the user interface displayed on the display device.

27. The non-transitory computer-readable medium of claim 16, wherein changes to the displayed portion of the modeled surface within the first pane of the user interface are animated in real-time with the shifting of the horizontal position of the inflection point by the user via the second pane of the user interface.

* * * * *